(12) United States Patent
Wang

(10) Patent No.: US 12,317,334 B2
(45) Date of Patent: May 27, 2025

(54) METHOD, APPARATUS FOR DETERMINING BEHAVIOR OF TERMINAL DEVICE, TERMINAL DEVICE AND NETWORK DEVICE

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/242,782

(22) Filed: Sep. 6, 2023

(65) Prior Publication Data
US 2023/0413337 A1    Dec. 21, 2023

Related U.S. Application Data

(63) Continuation of application No. PCT/CN2021/093948, filed on May 14, 2021.

(51) Int. Cl.
*H04W 74/0833* (2024.01)
*H04W 74/08* (2009.01)
*H04W 76/20* (2018.01)

(52) U.S. Cl.
CPC ... *H04W 74/0833* (2013.01); *H04W 74/0891* (2013.01); *H04W 76/20* (2018.02)

(58) Field of Classification Search
CPC ......... H04W 74/0833; H04W 74/0891; H04W 76/20; H04W 76/15; H04W 52/0235;
(Continued)

(56) References Cited

U.S. PATENT DOCUMENTS

| 9,131,363 | B2 | 9/2015 | Vujcic |
| 2013/0237208 | A1 | 9/2013 | Vujcic |

(Continued)

FOREIGN PATENT DOCUMENTS

| CN | 109150451 A | 1/2019 |
| CN | 109756994 A | 5/2019 |
| CN | 112399528 A | 2/2021 |
| CN | 112399630 A | 2/2021 |
| WO | 2012067333 A1 | 5/2012 |
| WO | 2020197306 A1 | 10/2020 |

(Continued)

OTHER PUBLICATIONS

International Search Report in the international application No. PCT/CN2021/093948, mailed on Dec. 28, 2021, 5 pages with English translation.
(Continued)

*Primary Examiner* — Yu-Wen Chang
(74) *Attorney, Agent, or Firm* — BAYES PLLC

(57) ABSTRACT

Provided in the embodiments of the present application are a method and apparatus for determining a behavior of a terminal device, and a terminal device and a network device. The method comprises: a terminal device receiving SCG configuration information sent by a network device, wherein the SCG configuration information comprises first indication information, and the first indication information is used to indicate whether the state of an SCG is an activated state or a deactivated state; and when the first indication information indicates that the state of the SCG is the deactivated state, the terminal device determining a behavior after the SCG is deactivated and/or whether to execute a procedure of random access to a PS Cell after the SCG is deactivated.

20 Claims, 8 Drawing Sheets a network device sends configuration information of a Secondary Cell Group (SCG) to the terminal device; and the terminal device receives the configuration information of the SCG from the network device; where the configuration information of the SCG includes first indication information, the first indication information indicating whether the SCG is in an active state or in a deactivated state — 201 in a case that the first indication information indicates that the SCG is in the deactivated state, the terminal device determines at least one of the following: a behavior after the SCG is deactivated; or, whether to perform a random access procedure to a Primary Secondary cell (PSCell) after the SCG is deactivated — 202

(58) Field of Classification Search
CPC . H04W 52/0245; H04W 76/27; H04W 76/34; H04W 76/19; H04W 76/00; H04L 5/0098; H04L 5/001; Y02D 30/70
See application file for complete search history.

(56) References Cited

U.S. PATENT DOCUMENTS

| | | | | |
|---|---|---|---|---|
| 2015/0271811 | A1* | 9/2015 | Kim | H04W 52/34 |
| | | | | 370/329 |
| 2020/0120735 | A1 | 4/2020 | Wang | |
| 2022/0007446 | A1* | 1/2022 | Purkayastha | G06F 1/3209 |
| 2022/0022067 | A1* | 1/2022 | Kim | H04L 5/0094 |
| 2022/0052906 | A1* | 2/2022 | Awoniyi-Oteri | H04L 41/0677 |
| 2022/0070782 | A1* | 3/2022 | Awoniyi-Oteri | H04L 5/0048 |
| 2022/0167445 | A1 | 5/2022 | Wang | |
| 2022/0225457 | A1* | 7/2022 | Purkayastha | H04W 76/15 |
| 2022/0369412 | A1* | 11/2022 | Teyeb | H04W 74/0833 |
| 2023/0232494 | A1* | 7/2023 | Wang | H04W 76/34 |
| | | | | 370/329 |
| 2023/0269607 | A1* | 8/2023 | Wang | H04W 76/15 |
| | | | | 370/328 |
| 2023/0337020 | A1* | 10/2023 | Da Silva | H04W 24/04 |
| 2023/0337286 | A1* | 10/2023 | Zhang | H04W 76/19 |
| 2023/0371109 | A1* | 11/2023 | Jang | H04B 17/327 |
| 2024/0064821 | A1* | 2/2024 | Pu | H04W 74/0833 |
| 2024/0237106 | A1* | 7/2024 | Agiwal | H04L 5/0098 |
| 2024/0414772 | A1* | 12/2024 | Kim | H04W 36/362 |

FOREIGN PATENT DOCUMENTS

| | | | | |
|---|---|---|---|---|
| WO | | 2021026906 | A1 | 2/2021 |
| WO | | 2021066701 | A1 | 4/2021 |
| WO | WO-2022154706 | A1 * | 7/2022 | |
| WO | WO-2022155841 | A1 * | 7/2022 | H04W 76/19 |

OTHER PUBLICATIONS

English translation of the Written Opinion of the International Search Authority in the international application No. PCT/CN2021/093948, mailed on Dec. 28, 2021, 8 pages with English translation.

"3rd Generation Partnership Project;Technical Specification Group Radio Access Network; NR; NR and NG-RAN Overall Description; Stage 2 (Release 16)", 3GPP TS 38.300 V16.3.0 (2020-09), cited in p. 50-92, 148 pages.

"3rd Generation Partnership Project;Technical Specification Group Radio Access Network; NR; Radio Resource Control (RRC) protocol specification (Release 16)", 3GPP TS 38.331 V16.2.0 (Sep. 2020), cited in p. 60-91, 916 pages.

Huawei, "New WID on further enhancements on Multi-Radio Dual-Connectivity", 3GPP TSG RAN Meeting #86 RP-193249, Dec. 9-12, 2019, 5 pages.

Supplementary European Search Report in the European application No. 21941404.2, mailed on Mar. 7, 2024, 12 pages.

Vivo: "Signaling aspect of SCG activation and deactivation", 3GPP Draft; R2-2101015, 3rd Generation Partnership Project (3GPP), MobileCompetence Centre ; 650, Route Des Lucioles ; F-06921 Sophia-Antipolis Cedex; France vol. RAN WG2, No. electronic; Jan. 25, 2021-Feb. 5, 2021, Jan. 15, 2021 (Jan. 15, 2021), XP051974056, paragraph [2.3.1] -paragraph [2.3.2], figure 1, 8 pages.

Vivo: "Ue behavior when SCG is deactivated", 3GPP Draft; R2-2105628, 3rd Generation Partnership Project (3GPP), MobileCompetence Centre ; 650, Route Des Lucioles ; E-06921 Sophia-Antipolis Cedex: France vol. Ran WG2, No. electronic; May 19 2021May 2, 2021 May 11, 2021 (May 11, 2021), XP052007193, paragraph [02.1] paragraph [02.2] paragraph [02.3] paragraph [02.6], 10pages.

Lenovo et al: "On SCG deactivation and activation", 3GPP Draft; R2-2009867, 3rd Generation Partnership Project (3GPP), Mobile Competence Centre; 650, Route Des Lucioles ; E-06921 Sophia-Antipolis Cedex; France vol. RAN WG2, No. Online; Nov. 2, 2020-Nov. 13, 2020 Oct. 23, 2020 (Oct. 23, 2020), XP051942669, paragraph [2.1.1], paragraph [2.1.3], 3 pages.

First Office Action of the European application No. 21941404.2, issued on Jan. 15, 2025. 4 pages.

Second Office Action of the Chinese application No. 202311381214.3, issued on Mar. 14, 2025. 13 pages with English translation.

First Office Action of the Chinese application No. 202311381214.3, issued on Oct. 13, 2024. 12 pages with English translation.

* cited by examiner

METHOD, APPARATUS FOR DETERMINING BEHAVIOR OF TERMINAL DEVICE, TERMINAL DEVICE AND NETWORK DEVICE

CROSS-REFERENCE TO RELATED APPLICATION

This application is a continuation of International Application No. PCT/CN2021/093948, filed on May 14, 2021, the disclosure of which is incorporated herein by reference in its entirety.

TECHNICAL FIELD

Embodiments of the disclosure relate to a technical field of communication, particularly to a method and apparatus for determining a behavior of a terminal device, a terminal device and a network device.

BACKGROUND

A Secondary Cell Group (SCG) can be in an active state or a deactivated state. For a terminal device, the SCG being in the deactivated state is more energy efficient than the SCG being in the activated state.

At present, when the SCG is in the deactivated state, a behavior of the terminal device in a Primary Secondary Cell (PSCell) is unknown, which results in that the activation of the SCG cannot be guaranteed.

SUMMARY

The embodiments of the disclosure provide a method and apparatus for determining a behavior of a terminal device, a terminal device and a network device.

A method for determining a behavior of a terminal device is provided by the embodiments of the disclosure, and the method includes the following operations: the terminal device receives configuration information of a Secondary Cell Group (SCG) from a network device, where the configuration information of the SCG includes first indication information, the first indication information indicating whether the SCG is in an active state or in a deactivated state; in a case that the first indication information indicates that the SCG is in the deactivated state, the terminal device determines at least one of the following: a behavior after the SCG is deactivated; or, whether to perform a random access procedure to a Primary Secondary cell (PSCell) after the SCG is deactivated.

A method for determining a behavior of a terminal device is provided by the embodiments of the disclosure, and the method includes the following operations: a network device sends configuration information of a Secondary Cell Group (SCG) to the terminal device, where the configuration information of the SCG includes first indication information, the first indication information indicating whether the SCG is in an active state or in a deactivated state; and the configuration information of the SCG is used for the terminal device to determine at least one of the following: a behavior after the SCG is deactivated; or, whether to perform a random access procedure to a Primary Secondary cell (PSCell) after the SCG is deactivated.

An apparatus for determining a behavior of a terminal device is provided by the embodiments of the disclosure, the apparatus is applied to the terminal device, and the apparatus includes a receiving unit and a determination unit. The receiving unit is configured to receive configuration information of a Secondary Cell Group (SCG) from a network device, where the configuration information of the SCG includes first indication information, the first indication information indicating whether the SCG is in an active state or in a deactivated state. The determination unit is configured to, in a case that the first indication information indicates that the SCG is in the deactivated state, determine at least one of the following: a behavior after the SCG is deactivated; or, whether to perform a random access procedure to a Primary Secondary cell (PSCell) after the SCG is deactivated.

An apparatus for determining a behavior of a terminal device is provided by the embodiments of the disclosure, the apparatus is applied to a network device, and the apparatus includes a sending unit. The sending unit is configured to send configuration information of a Secondary Cell Group (SCG) to the terminal device, where the configuration information of the SCG includes first indication information, the first indication information indicating whether the SCG is in an active state or in a deactivated state; and the configuration information of the SCG is used for the terminal device to determine at least one of the following: a behavior after the SCG is deactivated; or, whether to perform a random access procedure to a Primary Secondary cell (PSCell) after the SCG is deactivated.

A terminal device is provided by the embodiments of the disclosure, and the terminal device includes a processor and a memory. The memory is configured to store computer programs, and the processor is configured to call and run the computer programs stored in the memory to execute the method for determining the behavior of the terminal device described above.

A network device is provided by the embodiments of the disclosure, and the network device includes a processor and a memory. The memory is configured to store computer programs, and the processor is configured to call and run the computer programs stored in the memory to execute the method for determining the behavior of the terminal device described above.

A chip is provided by the embodiments of the disclosure, and the chip is configured to implement the method for determining the behavior of the terminal device described above. Specifically, the chip includes a processor, and the processor is configured to call and run computer programs in a memory to enable a device installed with the chip to execute the method for determining the behavior of the terminal device described above.

A computer-readable storage medium is provided by the embodiments of the disclosure, which is used for storing computer programs. The computer programs, when executed by a computer, enable the computer to execute the method for determining the behavior of the terminal device described above.

A computer program product is provided by the embodiments of the disclosure, and the computer program product includes computer program instructions. The computer program instructions, when executed by a computer, enable the computer to execute the method for determining the behavior of the terminal device described above. A computer program is provided by the embodiments of the disclosure, which enables a computer to execute the method for determining the behavior of the terminal device described above.

BRIEF DESCRIPTION OF THE DRAWINGS

The accompany drawings constituting a part of the disclosure provide further understanding of the disclosure. The schematic embodiments of the disclosure and description thereof are intended to be illustrative of the disclosure and do not constitute an undue limitation of the disclosure. In the accompanying drawings.

DETAILED DESCRIPTION

Technical solutions in the embodiments of the disclosure will be described with reference to the accompanying drawings in the embodiments of the disclosure. Apparently, the described embodiments are some embodiments of the disclosure rather than all of the embodiments. All other embodiments obtained by a person of ordinary skill in the art based on the embodiments of the disclosure without creative efforts shall fall within the protection scope of the disclosure.

The technical solutions of the embodiments of the disclosure may be applied to various communication systems, for example, a Long Term Evolution (LTE) system, an LTE Frequency Division Duplex (FDD) system, a LTE Time Division Duplex (TDD) system, a 5 Generation (5G) communication system, a future communication system, or the like.

Figure 1:
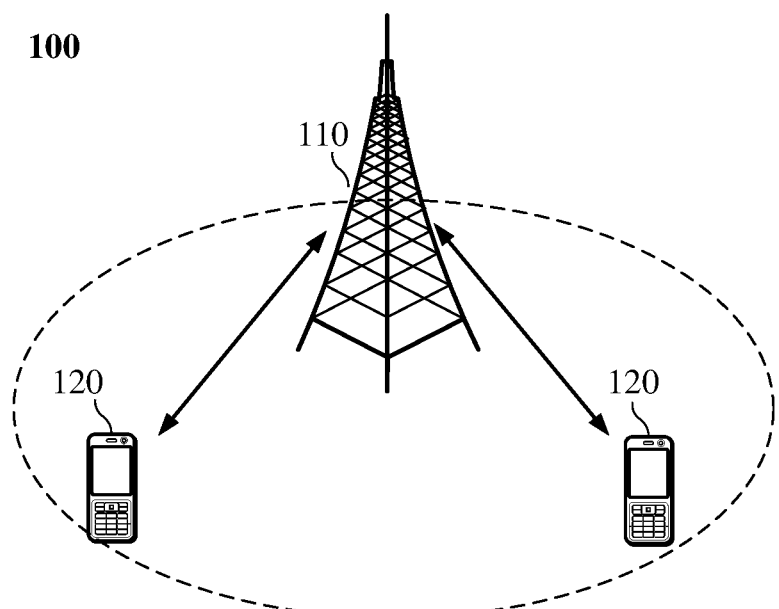
FIG. 1 is a schematic diagram of a communication system architecture according to an embodiment of the present disclosure.

For instance, FIG. 1 illustrates a communication system 100 to which the embodiments of the disclosure are applied. The communication system 100 may include a network device 110. The network device 110 may be a device communicating with a terminal device 120 (also called a communication terminal, or a terminal). The network device 110 may provide communication coverage for a specific geographical region and may communicate with a terminal device in the coverage. In an embodiment, the network device 110 may be an Evolutional Node B (eNB or eNodeB) in the LTE system or a wireless controller in a Cloud Radio Access Network (CRAN). In an embodiment, the network device may be a mobile switching center, a relay station, an access point, a vehicle-mounted device, a wearable device, a hub, a switch, a bridge, a router, a network-side device in a 5G network, a network device in a future communication system or the like.

The communication system 100 further includes at least one terminal device 120 within the coverage of the network device 110. A "terminal" as used herein includes, but is not limited to be connected via a wired line, such as via a Public Switched Telephone Network (PSTN), a Digital Subscriber Line (DSL), a digital cable, and a direct cable; and/or, via another data connection/network; and/or, via a wireless interface, such as for a cellular network, a Wireless Local Area Network (WLAN), a digital television network such as a Digital Video Broadcasting handheld (DVB-H) network, a satellite network, an Amplitude Modulation/Frequency Modulation (AM-FM) broadcast transmitter; and/or, a device of another terminal configured to receive/transmit communication signals; and/or, an Internet of Things (IoT) device. A terminal configured to communicate via a wireless interface may be referred as a "wireless communication terminal", a "wireless terminal" or a "mobile terminal". Examples of the mobile terminal include, but are not limited to, a satellite or cellular phone; a Personal Communications System (PCS) terminal that can combine a cellular radio phone with data processing, fax, and data communication capabilities; a Personal Digital Assistant (PDA) that includes a radio phone, a pager, an Internet/Intranet access, a Web browser, a memo pad, a calendar, and/or a Global Positioning System (GPS) receiver; and a conventional laptop and/or a palmtop receiver or other electronic devices including a radio telephone transceiver. The terminal may be an access terminal, a user equipment (UE), a subscriber unit, a subscriber station, a mobile station, a mobile console, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in a future evolved Public Land Mobile Network (PLMN), or the like.

In an embodiment, Device to Device (D2D) communication may be performed between the terminal devices 120.

In an embodiment, the 5G system or 5G network may also be called a New Radio (NR) system or network.

One network device and two terminal devices are exemplarily shown in FIG. 1. In an embodiment, the communication system 100 may include multiple network devices, and another number of terminal devices may be included in coverage of each network device, which is not limited in the embodiments of the disclosure.

In an embodiment, the wireless communication system 100 may further include another network entity such as a network controller and a mobility management entity, which is not limited in the embodiments of the disclosure.

It should be understood that, a device in the network/system of embodiments of the disclosure having a communication function may be referred to as a communication device. Taking the communication system 100 shown in FIG. 1 as an example, the communication terminal may include a network device 110 and a terminal device 120 both having a communication function. The network device 110 and the terminal device 120 may be devices described above, which are not described repeatedly here. The communication terminal may further include other devices in the communication system 100, such as a network controller and a mobility management entity, which is not limited in the embodiments of the disclosure.

It should be understood that, terms "system" and "network" in the disclosure are usually interchangeably used. The term "and/or" in the disclosure is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

For convenience of understanding the technical solutions of the embodiments of the disclosure, related technologies in embodiments of the disclosure are described. Any combination of the following related technologies and technical solutions of the embodiments of the disclosure belongs to the scope of the embodiments of the disclosure.

Due to people's demand on speed, latency, high-speed mobility, energy efficiency, as well as the diversity and complexity of service in future life, the 3rd Generation Partnership Project (3GPP) international standards organization has begun to develop 5G. The main application scenarios of 5G include: enhanced Mobile BroadBand (eMBB), Ultra-Reliable Low-Latency Communications (URLLC) and massive Machine-Type Communications (mMTC).

On the one hand, the eMBB still aims at providing users with multimedia content, services and data, and its demand is growing very rapidly. On the other hand, the eMBB may be deployed in different scenarios such as indoor, urban, rural, etc., and the capabilities and requirements of these scenarios vary greatly. Therefore, it is necessary to make detailed analysis combined with specific scenarios and may not be unconditionally defined. Typical applications of the URLLC includes: industrial automation, power automation, remote medical operation (surgery), traffic safeguard, etc. Typical characteristics of the mMTC includes: high connection density, small data amount, delay-insensitive services, low cost and long service life of modules and so on.

In the early deployment of NR, it is difficult to obtain an entire NR coverage; therefore, the typical network coverage is a wide-area LTE coverage mode and an NR island coverage mode. Moreover, a large amount of LTE deployments are below 6 GHz, and there are few spectrums below 6 GHz that can be used by 5G. Therefore, it is necessary for the NR to research the application of the spectrum above 6 GHz, however, the high frequency band has limited coverage and fast signal fading. Meanwhile, in order to protect the early investment of mobile operators in LTE, an operation mode of tight interworking between LTE and NR is proposed.

In order to achieve a 5G network deployment and commercial applications as soon as possible, 3GPP has completed the first version of 5G firstly, i.e., E-UTRA-NR Dual Connectivity (EN-DC), before the end of December 2017. It the EN-DC, the LTE base station (i.e., eNB) serves as a master node (MN), and the NR base station (i.e., gNB or en-gNB) serves as a secondary node (i.e., SN). Herein, the MN is mainly responsible for a RRC control function and a control plane to the core network. The SN may be configured with auxiliary signaling, such as SRB3, which mainly provides a data transmission function.

In the later stage of R15, other Dual Connectivity (DC) modes may be supported, such as NR-E-UTRA Dual Connectivity (NE-DC), 5GC-EN-DC, and NR DC. For EN-DC, the core network connected to the access network is Evolved Packet Core network (EPC), while the connected core network in other DC modes is 5G Core Network (5GC).

In Multi-RAT Dual Connectivity (MR-DC), after the SCG is configured through configuration information of the SCG, the SCG is in the active state by default. At this time, the configuration information of the SCG includes synchronization reconfiguration (ReconfigurationWithSync), which is configured to trigger the terminal device to perform the random access procedure to the PSCell. Contents of the synchronization reconfiguration may be referred to as shown in Table 1 below.

TABLE 1

| ReconfigurationWithSync ::= | SEQUENCE { |
|---|---|
| spCellConfigCommon | |
| ServingCellConfigCommon | |
| OPTIONAL,    -- Need M | |
| newUE-Identity | RNTI-Value, |
| t304 | ENUMERATED {ms50, |
| ms100, ms150, ms200, ms500, ms1000, ms2000, ms10000}, | |
| rach-ConfigDedicated | CHOICE { |
| uplink | RACH- |
| ConfigDedicated, | |
| supplementaryUplink | RACH- |
| ConfigDedicated | |
| } | |
| OPTIONAL,    -- Need N | |
| ..., | |
| [[ | |
| smtc | SSB-MTC |
| OPTIONAL    -- Need S | |
| ]], | |
| [[ | |
| daps-UplinkPowerConfig-r16 | DAPS-UplinkPowerConfig-r16 |
| OPTIONAL    -- Need N | |
| ]] | |

The SCG may be in a deactivated state or in an activated state; the SCG may enter the deactivated state after the SCG is deactivated, and the SCG may enter the activated state after the SCG is activated. A terminal device is more energy efficient in a case that the SCG is in the deactivated state than in a case the SCG is in the activated state.

On the one hand, after the SCG is in the deactivated state, a behavior of the terminal device in the PSCell is unknown. On the other hand, during the SCG deactivation, an uplink synchronization relationship between the terminal device and the PSCell may be lost. For example, in response to expiration of a timer for controlling the uplink synchronization, it indicates that the uplink synchronization relationship between the terminal device and the PSCell is lost. If the terminal device maintains the uplink synchronization at all times, frequent random access procedures are needed to resume the uplink synchronization, as well as to acquire good inter-beam synchronization with the network. This has a disadvantage of being power-consuming. However, if the random access procedure is not performed, the terminal device and the PSCell would be always in a non-synchronized state, which in turn causes an increase in a latency of the SCG activation.

To this end, the following technical solutions for embodiments of the present disclosure are provided. The technical solutions of the embodiments of the present disclosure specify how the behavior of the terminal device is constrained in the scenario of the SCG deactivation.

The technical solutions of the embodiments of the present disclosure can be applied to a dual connectivity (DC) architecture or a multi-connectivity (MC) architecture. In the DC architecture, an MCG and an SCG are included. In the MC architecture, an MCG and multiple SCGs are included. Here, a cell group on a MN side is called MCG, and a cell group on a SN side is called SCG. The embodiments of the present disclosure do not limit the type of DC. For example, the type of DC may be a MR-DC, an EN-DC, a NE-DC, a NR-DC, or the like. The embodiments of the present disclosure also do not limit the type of MC.

It should be noted that the description of the "MCG side" in the embodiments of the present disclosure may further be referred to as the "MN side", and the description of the "SCG side" may further be referred to as the "SN side".

According to the above technical solutions, the terminal device, based on the configuration from the network device, determines at least one of the following: the behavior for PSCell after the SCG is deactivated; or, whether to perform the random access procedure to the PSCell after the SCG is deactivated. Thereby, the activation of the PSCell can be guaranteed.

Figure 2:
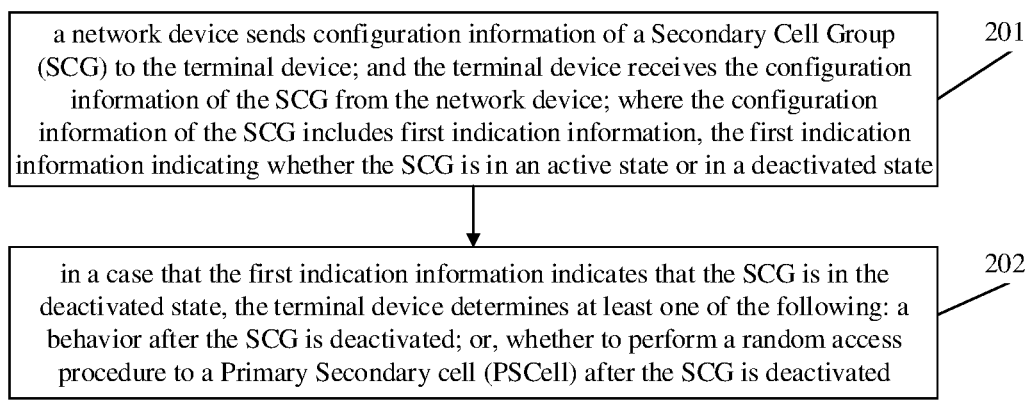
FIG. 2 is a flowchart of a method for determining a behavior of a terminal device according to an embodiment of the present disclosure.

FIG. 2 is a flowchart of a method for determining a behavior of a terminal device according to an embodiment of the present disclosure. As shown in FIG. 2, the method for determining the behavior of the terminal device includes the following operations.

At block 201, a network device sends configuration information of a Secondary Cell Group (SCG) to the terminal device; and the terminal device receives the configuration information of the SCG from the network device. Here, the configuration information of the SCG includes first indication information, the first indication information indicating whether the SCG is in an active state or in a deactivated state.

At block 202, in a case that the first indication information indicates that the SCG is in the deactivated state, the terminal device determines at least one of the following: a behavior after the SCG is deactivated; or, whether to perform a random access procedure to a Primary Secondary cell (PSCell) after the SCG is deactivated.

In an embodiment of the present disclosure, the terminal device in an RRC connected state receives the configuration information of the SCG from the network device. The configuration information of the SCG is used for the terminal device to determine at least one of the following: a behavior after the SCG is deactivated; or, whether to perform a random access procedure to the PSCell after the SCG is deactivated. In some optional implementations, the network device may be a MN.

In some optional implementations, the configuration information of the SCG is carried in an RRC reconfiguration (RRCReconfiguration) message or an RRC resume (RRCResume) message.

In an embodiment of the present disclosure, the configuration information of the SCG includes the first indication information, the first indication information indicating whether the SCG is in the active state or in the deactivated state. Here, the first indication information may also be referred to as "indication information of SCG deactivation". The indication information of SCG deactivation may indicates whether an initial state of the SCG is an active state or a deactivated state. Further, in an embodiment, in a case that the configuration information of the SCG does not include the indication information of SCG deactivation, the initial state of the SCG is the active state by default.

In an embodiment of the present disclosure, the terminal device determines at least one of the following: the behavior after the SCG is deactivated; or, whether to perform a random access procedure to the PSCell after the SCG is deactivated. The following are explained in combination with different situations.

Solution 1

In an embodiment of the present disclosure, the configuration information of the SCG further includes first configuration information, and the first configuration information is used for determining the behavior of the terminal device after the SCG is deactivated.

Here, the first configuration information may also be referred to as "behavior constraint configuration information of SCG deactivation". In an embodiment, the first configuration information is configured only when the first indication information indicates that the SCG is in the deactivated state.

Solution A1) The first configuration information includes second indication information, the second indication information indicating a type of SCG deactivation. In a case that the second indication information indicates that the SCG deactivation is of a first type, the second indication information indicates that the terminal device does not need to perform at least one behavior for the PSCell. In a case that the second indication information indicates that the SCG deactivation is of a second type, the second indication information indicates that the terminal device needs to perform the at least one behavior for the PSCell.

In some optional implementations, the at least one behavior includes at least one of: Channel Status Indicator (CSI) Measurement, CSI Report, Radio Link Failure (RLF) Recovery, Beam Failure Detection (BFD), Beam Failure Recovery (BFR), or Timing Advance (TA) Maintenance.

It should be noted that, after the SCG is deactivated, regardless of the type of SCG deactivation, the terminal device does not perform the operations of: listening for a Physical Downlink Control Channel (PDCCH), receiving of a Physical Downlink Shared Channel (PDSCH), and transmitting of a Physical Uplink Shared Channel (PUSCH).

Solution B1) The first configuration information includes a first bit map, each bit in the first bit map corresponds to one or more behaviors, and has a value indicating whether the one or more behaviors corresponding to the bit need to be performed by the terminal device.

In some optional implementations, all behaviors corresponding to all bits in the first bit map include at least one of: CSI Measurement, CSI Report, BFD, BFR, or TA Maintenance.

In an embodiment of the present disclosure, the terminal device determines, based on the first configuration information, the behavior of the terminal device after the SCG is deactivated.

Figure 3:
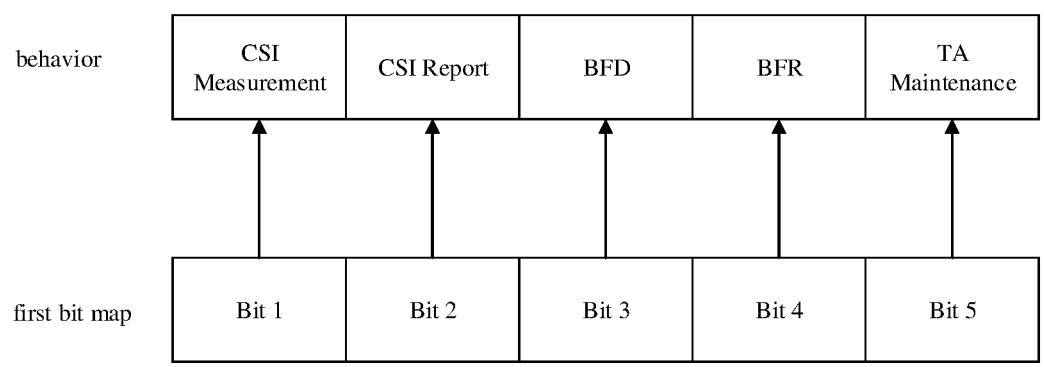
FIG. 3 a schematic diagram of a mapping relationship between bit(s) in a first bit map and behavior(s) according to an embodiment of the present disclosure.

As an example, referring to FIG. 3, the first bit map includes 5 bits, bit 1 corresponds to the CSI Measurement, bit 2 corresponds to the CSI Report, bit 3 corresponds to the BFD, bit 4 corresponds to the BFR, and bit 5 corresponds to the TA maintenance. A value of 1 for a bit indicates that the behavior(s) corresponding to the bit needs to be performed by the terminal device, and a value of 0 for the bit indicates that the behavior(s) corresponding to the bit does not need to be performed by the terminal device. Or, a value of 0 for a bit indicates that the behavior(s) corresponding to the bit needs to be performed by the terminal device, and a value of 1 for the bit indicates that the behavior(s) corresponding to the bit does not need to be performed by the terminal device.

Solution 2

In an embodiment of the present disclosure, the configuration information of the SCG further includes second configuration information; and the second configuration information is used for determining whether the terminal device needs to perform the random access procedure to the PSCell after the SCG is deactivated.

Here, the configuration information of the SCG may also be referred to as "configuration information for the terminal device to perform resynchronization".

Solution A2) The second configuration information includes a first threshold, and the first threshold is used for the terminal device to determine, based on a signal quality of the PSCell measured by the terminal device, whether to perform the random access procedure to the PSCell. Specifically, after the SCG is deactivated, in a case that the signal quality of the PSCell measured by the terminal device is less than or equal to the first threshold, the terminal device determines to perform the random access procedure to the PSCell, and obtains uplink synchronization with the PSCell.

In an embodiment, the signal quality includes at least one of a Reference Signal Received Power (RSRP) or a Reference Signal Received Quality (RSRQ).

Solution B2) The second configuration information includes a second threshold, and the second threshold is used for the terminal device to determine, based on a variation of a signal quality of the PSCell measured by the terminal device, whether to perform the random access procedure to the PSCell. Specifically, after the SCG is deactivated, in a case that the variation of the signal quality of the PSCell measured by the terminal device is greater than or equal to the second threshold, the terminal device determines to perform the random access procedure to the PSCell, and obtains uplink synchronization with the PSCell.

In an embodiment, the signal quality includes at least one of a RSRP or a RSRQ.

Solution C2) The second configuration information includes length information of a first period, and the length information of the first period is used for the terminal device to perform periodically the random access procedure to the PSCell. Specifically, after the SCG is deactivated, the terminal device performs periodically, based on the length information of the first period, the random access procedure to the PSCell, and obtains uplink synchronization with the PSCell.

Solution D2) The second configuration information includes length information of a first timer, and the first timer is used for triggering the terminal device to perform the random access procedure to the PSCell. Specifically, after the SCG is deactivated, the terminal device starts the first timer at a first time instant; in response to expiration of the first timer, the terminal device performs the random access procedure to the PSCell, and obtains uplink synchronization with the PSCell.

In an embodiment, the first time instant is a time instant when the SCG is deactivated, or a time instant when a Timing Advance Timer (TAT) is expired, or a time instant when the TAT is stopped.

Solution 3

In an embodiment of the present disclosure, after the SCG is deactivated, in response to receiving a first command from a Master Node (MN), the terminal device determines to perform the random access procedure to the PSCell, and obtains uplink synchronization with the PSCell. Herein, the first command is used for triggering the terminal device to perform the random access procedure to the PSCell.

In an embodiment, the first command is carried in a Radio Resource Control (RRC) signaling or a Media Access Control (MAC) Control Element (CE).

In some optional implementations, the first command is sent to the terminal device after the MN receives a request from a Secondary Node (SN).

Solution 4

In an embodiment of the present disclosure, the configuration information of the SCG includes synchronization reconfiguration (ReconfigurationWithSync). In this case, the terminal device may follow the following scheme to determine whether to perform the random access procedure to the PSCell.

Solution A4) The first indication information is used for the terminal device to determine whether to perform the random access procedure to the PSCell. Specifically, in a case that the first indication information indicates that the SCG is in the deactivated state, the terminal device determines not to perform the random access procedure to the PSCell. In a case that the first indication information indicates that the SCG is in the active state, the terminal device determines to perform the random access procedure to the PSCell.

Solution B4) The configuration information of the SCG includes third indication information, and the third indication information indicates whether the terminal device needs to perform the random access procedure to the PSCell. The terminal device determines, based on the third indication information, whether to perform the random access procedure to the PSCell.

The technical solutions of the embodiments of the present disclosure are exemplified below in combination with specific application examples.

Application Example 1

The terminal device in the RRC connected state receives the configuration information of the SCG from the network device. In an embodiment, the configuration information of the SCG is carried in an RRCReconfiguration message or an RRCResume message.

In the application example, the configuration information of the SCG includes the first indication information (i.e., the indication information of SCG deactivation), and the first indication information indicates whether the initial state of the SCG is the active state or the deactivated state. In a case that the first indication information is not present, the initial state of the SCG is the active state by default.

In the application example, the configuration information of the SCG includes the first configuration information (i.e., the SCG deactivation behavior constraint configuration information), and the first configuration information is configured when and only when the first indication information indicates that the SCG is in the deactivated state. The first configuration information is used to display or implicitly configure requirements of the behavior of the terminal device after the SCG is deactivated.

In some optional implementations, the first configuration information includes second indication information, and the second indication information indicates a type of SCG deactivation. As an example, the SCG deactivation may be of two types: a type 1 and a type 2. For the type 1 (i.e., type-1 SCG deactivation), it is indicated that the terminal device does not need to perform at least one of the following behaviors for the PSCell after the SCG is deactivated: CSI Measurement, CSI Report, RLF, BFD, TA Maintenance, or BFR. For the type 2 (i.e., second type-2 SCG deactivation), it is indicated that the terminal device needs to perform at least one of the following behaviors for the PSCell after the SCG is deactivated: CSI Measurement, CSI Report, RLF, BFD, TA Maintenance, or BFR.

It should be noted that, after the SCG is deactivated, the terminal device definitely does not perform the listening for the PDCCH, the receiving of PDSCH and the transmitting of the PUSCH, regardless of the type of the SCG deactivation.

In some optional implementations, the first configuration information includes a first bit map (bitmap). Each bit in the first bit map corresponds to one or more behaviors, and has a value indicating whether the one or more behaviors corresponding to the bit need to be performed by the terminal device after the SCG is deactivated. As an example, a value of 1 for the bit indicates that the behavior(s) corresponding to the bit needs to be performed by the terminal device, and a value of 0 for the bit indicates that the behavior(s) corresponding to the bit does not need to be performed by the terminal device. The behavior(s) corresponding to each bit in the first bit map may include at least one of: CSI Measurement, CSI Report, RLF, BFD, TA Maintenance, or BFR.

Application Example 2

The terminal device in the RRC connected state receives the configuration information of the SCG from the network device. In an embodiment, the configuration information of the SCG is carried in an RRCReconfiguration message or an RRCResume message.

In the application example, the configuration information of the SCG includes the first indication information (i.e., the indication information of SCG deactivation), and the first indication information indicates whether the initial state of the SCG is the active state or the deactivated state. In a case that the first indication information is not present, the initial state of the SCG is the active state by default.

In the application example, the configuration information of the SCG includes second configuration information (i.e., the configuration information for the terminal device to perform resynchronization).

In some optional implementations, the second configuration information is the configuration information based on a first threshold of at least one of a RSRP or a RSRQ. In a case that a measured value of at least one of the RSRP or the RSRQ of the PSCell is less than or equal to the first threshold, the terminal device is triggered to perform the random access procedure, and obtain resynchronization with the PSCell.

In some optional implementations, the second configuration information is the configuration information based on a second threshold of at least one of a RSRP or a RSRQ. In a case that a variation of a measured value of at least one of the RSRP or the RSRQ of the PSCell is greater than or equal to the second threshold, the terminal device is triggered to perform the random access procedure, and obtain resynchronization with the PSCell.

In some optional implementations, the second configuration information may be length information of a period, or length information of a timer T1. After the SCG is deactivated, or when a TAT timer is expired, or when the TAT timer is stopped, the timer T1 is started. In response to expiration of the timer T1, the terminal device is triggered to perform the random access procedure, and obtain resynchronization with the PSCell.

In some optional implementations, the terminal device receives a first command from a MN, and the first command is used for triggering the terminal device to perform the random access procedure to the PSCell and obtain resynchronization with the PSCell. In an embodiment, the first command may be carried in an RRC signaling or an MAC CE. Here, after receiving a request from a SN, the MN sends the first command to the terminal device. In other words, the request from the SN is used for triggering the MN to send the first command to the terminal device.

Application Example 3

The terminal device in the RRC connected state receives the configuration information of the SCG from the network device. In an embodiment, the configuration information of the SCG is carried in an RRCReconfiguration message or an RRCResume message.

The application example is mainly applied in a scenario of SCG addition or SCG change, and the configuration information of the SCG includes synchronization reconfiguration (ReconfigurationWithSync).

In some optional implementations, in a case that the configuration information of the SCG includes first indication information, and the first indication information indicates that the SCG is in the deactivated state, the terminal device does not perform the random access procedure to the PSCell. Otherwise, the terminal device performs the random access procedure to the PSCell In some optional implementations, the configuration information of the SCG includes third indication information, and the third indication information indicates whether the terminal device needs to perform the random access procedure to the PSCell. The terminal device determines, based on the third indication information, whether to perform the random access procedure to the PSCell.

Figure 4:
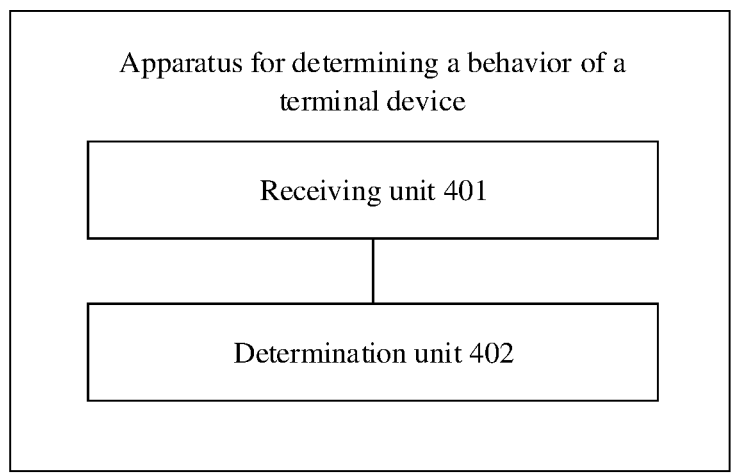
FIG. 4 is a schematic diagram of a first structure of an apparatus for determining a behavior of a terminal device according to an embodiment of the present disclosure.

FIG. 4 is a schematic diagram of a first structure of an apparatus for determining a behavior of a terminal device according to an embodiment of the present disclosure, which is applied to the terminal device. As shown in FIG. 4, the apparatus for determining the behavior of the terminal device includes a receiving unit 401 and a determination unit 402.

The receiving unit 401 is configured to receive configuration information of a Secondary Cell Group (SCG) from a network device. The configuration information of the SCG includes first indication information. The first indication information indicates whether the SCG is in an active state or in a deactivated state.

The determination unit 402 is configured to, in a case that the first indication information indicates that the SCG is in the deactivated state, determine at least one of the following: a behavior after the SCG is deactivated; or, whether to perform a random access procedure to a Primary Secondary cell (PSCell) after the SCG is deactivated.

In some optional implementations, the configuration information of the SCG further includes first configuration information, and the first configuration information is used for determining the behavior of the terminal device after the SCG is deactivated.

In some optional implementations, the first configuration information includes second indication information, and the second indication information indicates a type of SCG deactivation.

In a case that the second indication information indicates that the SCG deactivation is of a first type, the second indication information indicates that the terminal device does not need to perform at least one behavior for the PSCell.

In a case that the second indication information indicates that the SCG deactivation is of a second type, the second indication information indicates that the terminal device needs to perform the at least one behavior for the PSCell.

In some optional implementations, the at least one behavior includes at least one of: Channel Status Indicator (CSI) Measurement, CSI Report, Radio Link Failure (RLF) Recovery, Beam Failure Detection (BFD), Beam Failure Recovery (BFR), or Timing Advance (TA) Maintenance.

In some optional implementations, the first configuration information includes a first bit map. Each bit in the first bit map corresponds to one or more behaviors, and has a value indicating whether the one or more behaviors corresponding to the bit need to be performed by the terminal device.

In some optional implementations, all behaviors corresponding to all bits in the first bit map include at least one of: CSI Measurement, CSI Report, BFD, BFR, or TA Maintenance.

In some optional implementations, the determination unit 402 is configured to determine, based on the first configuration information, the behavior of the terminal device after the SCG is deactivated.

In some optional implementations, the configuration information of the SCG further includes second configuration information; and the second configuration information is used for determining whether the terminal device needs to perform the random access procedure to the PSCell after the SCG is deactivated.

In some optional implementations, the second configuration information includes a first threshold.

The determination unit 402 is configured to, after the SCG is deactivated, in a case that a signal quality of the PSCell measured by the terminal device is less than or equal to the first threshold, determine to perform the random access procedure to the PSCell, and obtain uplink synchronization with the PSCell.

In some optional implementations, the second configuration information includes a second threshold.

The determination unit 402 is configured to, after the SCG is deactivated, in a case that a variation of a signal quality of the PSCell measured by the terminal device is greater than or equal to the second threshold, determine to perform the random access procedure to the PSCell, and obtain uplink synchronization with the PSCell.

In some optional implementations, the signal quality includes at least one of a Reference Signal Received Power (RSRP) or a Reference Signal Received Quality (RSRQ).

In some optional implementations, the second configuration information includes length information of a first period.

The apparatus further includes an execution unit, which is configured to, after the SCG is deactivated, perform, based on the length information of the first period, the random access procedure to the PSCell, and obtain uplink synchronization with the PSCell.

In some optional implementations, the second configuration information includes length information of a first timer.

The apparatus further includes an execution unit. The execution unit is configured to start the first timer at a first time instant; in response to expiration of the first timer, perform the random access procedure to the PSCell, and obtain uplink synchronization with the PSCell.

In some optional implementations, the first time instant is a time instant when the SCG is deactivated, or a time instant when a Timing Advance Timer (TAT) is expired, or a time instant when the TAT is stopped.

In some optional implementations, the determination unit 402 is configured to, after the SCG is deactivated, in response to the receiving unit 401 receiving a first command from a Master Node (MN), determine to perform the random access procedure to the PSCell and obtain uplink synchronization with the PSCell. The first command is used for triggering the terminal device to perform the random access procedure to the PSCell.

In some optional implementations, the first command is carried in a Radio Resource Control (RRC) signaling or a Media Access Control (MAC) Control Element (CE).

In some optional implementations, the first command is sent to the terminal device after the MN receives a request from a Secondary Node (SN).

In some optional implementations, the configuration information of the SCG includes synchronization reconfiguration.

In some optional implementations, the determination unit 402 is configured to, in a case that the first indication information indicates that the SCG is in the deactivated state, determine not to perform the random access procedure to the PSCell.

In some optional implementations, the determination unit 402 is further configured to, in a case that the first indication information indicates that the SCG is in the active state, determine to perform the random access procedure to the PSCell.

In some optional implementations, the configuration information of the SCG includes third indication information, and the third indication information indicates whether the terminal device needs to perform the random access procedure to the PSCell.

The determination unit 402 is configured to determine, based on the third indication information, whether to perform the random access procedure to the PSCell.

In some optional implementations, the configuration information of the SCG is carried in an RRC reconfiguration message or an RRC resume message.

Those skilled in the art should understand that, the relevant description of the aforementioned apparatus for determining the behavior of the terminal device according to the embodiments of the present disclosure may be understood with reference to the relevant description of the method for determining the behavior of the terminal device according to the embodiments of the present disclosure.

Figure 5:
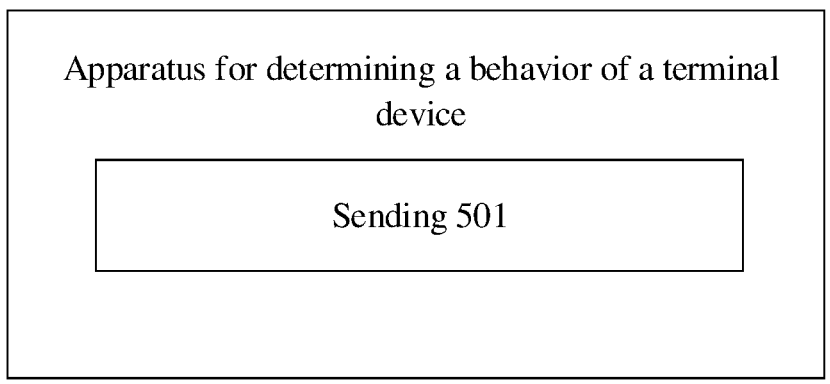
FIG. 5 is a schematic diagram of a second structure of an apparatus for determining a behavior of a terminal device according to an embodiment of the present disclosure.

FIG. 5 is a schematic diagram of a second structure of an apparatus for determining a behavior of a terminal device according to an embodiment of the present disclosure, which is applied to a network device. As shown in FIG. 5, the apparatus for determining the behavior of the terminal device includes a sending unit 501.

The sending unit 501 is configured to send configuration information of a Secondary Cell Group (SCG) to the terminal device, where the configuration information of the SCG includes first indication information, the first indication information indicating whether the SCG is in an active state or in a deactivated state; and the configuration information of the SCG is used for the terminal device to determine at least one of the following: a behavior after the SCG is deactivated; or, whether to perform a random access procedure to a Primary Secondary cell (PSCell) after the SCG is deactivated.

In some optional implementations, the configuration information of the SCG further includes first configuration information, and the first configuration information is used for determining the behavior of the terminal device after the SCG is deactivated.

In some optional implementations, the first configuration information includes second indication information, and the second indication information indicates a type of SCG deactivation.

In a case that the second indication information indicates that the SCG deactivation is of a first type, the second indication information indicates that the terminal device does not need to perform at least one behavior for the PSCell.

In a case that the second indication information indicates that the SCG deactivation is of a second type, the second indication information indicates that the terminal device needs to perform the at least one behavior for the PSCell.

In some optional implementations, the at least one behavior includes at least one of: Channel Status Indicator (CSI) Measurement, CSI Report, Radio Link Failure (RLF) Recovery, Beam Failure Detection (BFD), Beam Failure Recovery (BFR), or Timing Advance (TA) Maintenance.

In some optional implementations, the first configuration information includes a first bit map, each bit in the first bit map corresponding to one or more behaviors, and having a value indicating whether the one or more behaviors corresponding to the bit need to be performed by the terminal device.

In some optional implementations, all behaviors corresponding to all bits in the first bit map include at least one of: CSI Measurement, CSI Report, BFD, BFR, or TA Maintenance.

In some optional implementations, the configuration information of the SCG further includes second configuration information; and the second configuration information is used for determining whether the terminal device needs to perform the random access procedure to the PSCell after the SCG is deactivated.

In some optional implementations, the second configuration information includes a first threshold, and the first threshold is used for the terminal device to determine, based on a signal quality of the PSCell measured by the terminal device, whether to perform the random access procedure to the PSCell.

In some optional implementations, the second configuration information includes a second threshold, and the second threshold is used for the terminal device to determine, based on a variation of a signal quality of the PSCell measured by the terminal device, whether to perform the random access procedure to the PSCell.

In some optional implementations, the signal quality includes at least one of a Reference Signal Received Power (RSRP) or a Reference Signal Received Quality (RSRQ).

In some optional implementations, the second configuration information includes length information of a first period, and the length information of the first period is used for the terminal device to perform periodically the random access procedure to the PSCell.

In some optional implementations, the second configuration information includes length information of a first timer, and the first timer is used for triggering the terminal device to perform the random access procedure to the PSCell.

In some optional implementations, the configuration information of the SCG includes synchronization reconfiguration.

In some optional implementations, the first indication information is used for the terminal device to determine whether to perform the random access procedure to the PSCell.

In some optional implementations, the configuration information of the SCG includes third indication information, and the third indication information indicates whether the terminal device needs to perform the random access procedure to the PSCell.

In some optional implementations, the configuration information of the SCG is carried in an RRC reconfiguration message or an RRC resume message.

Those skilled in the art should understand that, the relevant description of the aforementioned apparatus for determining the behavior of the terminal device according to the embodiments of the present disclosure may be understood with reference to the relevant description of the method for determining the behavior of the terminal device according to the embodiments of the present disclosure.

Figure 6:
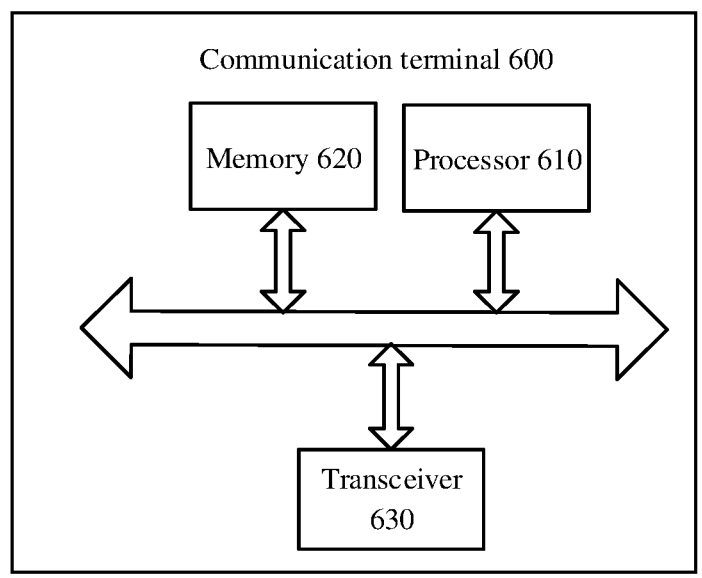
FIG. 6 is a schematic structural diagram of a communication device according to an embodiment of the present disclosure.

FIG. 6 is a schematic structural diagram of a communication device 600 according to an embodiment of the present disclosure. The communication terminal 600 may be a terminal, or a network device. As shown in FIG. 6, the communication terminal 600 includes a processor 610, the processor 610 may call and run a computer program from a memory to implement the method in the embodiments of the present disclosure.

In an embodiment, as shown in FIG. 6, the communication terminal 600 may further include a memory 620. Herein, the processor 610 may call and run a computer program from the memory 620 to implement the method in the embodiments of the present disclosure.

Herein, the memory 620 may be a separate device independent of the processor 610 or may be integrated in the processor 610.

In an embodiment, as shown in FIG. 6, the communication terminal 600 may further include a transceiver 630, and the processor 610 may control the transceiver 630 to communicate with other devices. Specifically, the transceiver 630 may transmit information or data to other devices, or receive information or data from other devices.

Herein, the transceiver 630 may include a transmitter and a receiver. The transceiver 630 may further include one or more antennas.

In an embodiment, the communication terminal 600 may be the network device of the embodiments of the present disclosure. The communication terminal 600 may implement the corresponding process implemented by the network device in each method of the embodiments of the present disclosure. For brevity, details will not be repeated herein again.

In an embodiment, the communication terminal 600 may specifically be the mobile terminal/terminal of the embodiments of the present disclosure. The communication terminal 600 may implement the corresponding process implemented by the mobile terminal/terminal in each method of the embodiments of the present disclosure. For brevity, details will not be repeated herein again.

Figure 7:
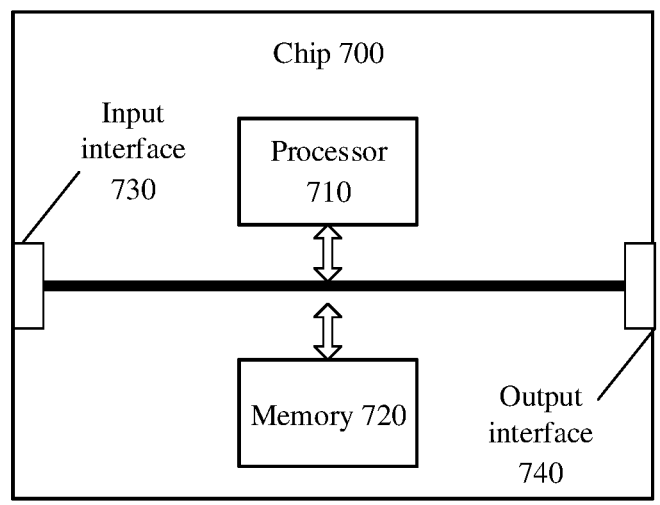
FIG. 7 is a schematic structural diagram of a chip according to an embodiment of the present disclosure.

FIG. 7 is a schematic structural diagram of a chip according to an embodiment of the present disclosure. The chip 700 illustrated in FIG. 7 includes a processor 710, and the processor 710 may call and run a computer program from a memory to implement the method in the embodiments of the present disclosure.

In an embodiment, as shown in FIG. 7, the chip 700 may further include a memory 720. Herein, the processor 710 may call and run a computer program from the memory 720 to implement the method in the embodiments of the present disclosure.

Herein, the memory 720 may be a separate device independent of the processor 710 or may be integrated in the processor 710.

In an embodiment, the chip 700 may further include an input interface 730. Herein, the processor 710 may control the input interface 730 to communicate with other devices or chips. Specifically, the input interface 730 may acquire information or data from other devices and chips.

In an embodiment, the chip 700 may further include an output interface 740. Herein, the processor 710 may control the output interface 740 to communicate with other devices or chips. Specifically, the output interface 740 may output information or data to other devices and chips.

In an embodiment, the chip may be applied to the network device in the embodiments of the disclosure, and the chip may implement the corresponding process implemented by the network device in each method of the embodiments of the present disclosure. For brevity, details will not be repeated herein again.

In an embodiment, the chip may be applied to the mobile terminal/terminal in the embodiments of the disclosure, and the chip may implement the corresponding process implemented by the mobile terminal/terminal in each method of the embodiments of the present disclosure. For brevity, details will not be repeated herein again.

It should be understood that the chip mentioned in the embodiment of the present disclosure may also be referred as a system-level chip, a system chip, a chip system, or a system-on chip, etc.

Figure 8:
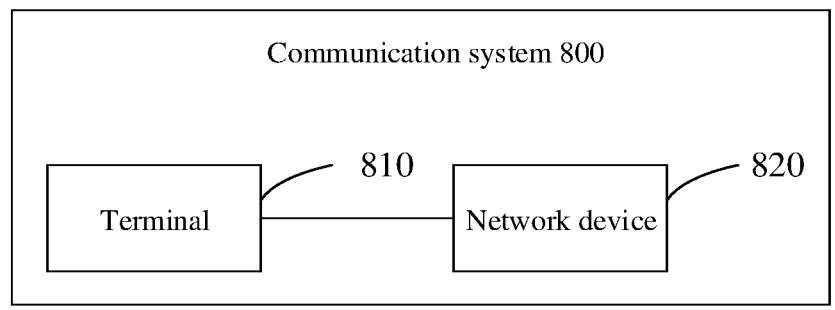
FIG. 8 is a schematic block of a communication system according to an embodiment of the present disclosure.

FIG. 8 is a schematic block of a communication system 800 according to an embodiment of the present disclosure. As shown in FIG. 8, the communication system 800 includes a terminal 810 and a network device 820.

Herein, the terminal 810 may be configured to implement the functions implemented by the terminal in the foregoing method, and the network device 820 may be configured to implement the functions implemented by the network device in the foregoing method. For brevity, details are not described herein again.

It should be understood that the processor in the embodiment of the disclosure may be an integrated circuit chip and has a signal processing capability. In an implementation process, each step of the method embodiment may be completed by an integrated logical circuit of hardware or an instruction in a software form in the processor. The above processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any common processor and the like. The operations of the method disclosed in combination with the embodiments of the disclosure may be directly embodied to be executed and implemented by a hardware decoding processor or executed and implemented by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the methods in combination with hardware.

It can be understood that the memory in the embodiments of the disclosure may be a volatile memory or a nonvolatile memory, or may include both the volatile and nonvolatile memories. The nonvolatile memory may be a ROM, a PROM, an Erasable PROM, an EPROM, an EEPROM or a flash memory. The volatile memory may be a RAM, which is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of a system and method described in the disclosure is intended to include, but not limited to, memories of these and any other proper types.

It should be understood that the above memory is described only exemplarily rather than limitedly. For example, the memory in the embodiments of the present disclosure may be a SRAM, a DRAM, a SDRAM, a DDR SDRAM, an ESDRAM, a SLDRAM, a DR RAM and the like. That is, the memory in the embodiment of the present disclosure is intended to include, but not limited to, memories of these and any other proper types.

The embodiment of the present disclosure further provides a computer-readable storage medium for storing computer programs.

In an embodiment, the computer-readable storage medium may be applied to the network device in the embodiments of the disclosure, and the computer programs are executed to cause the computer to perform the corresponding processes implemented by the network device in each method of the embodiments of the present disclosure. For brevity, details will not be repeated herein again.

In an embodiment, the computer-readable storage medium may be applied to the mobile terminal/terminal in the embodiment of the disclosure, and the computer programs cause the computer to perform the corresponding processes implemented by the mobile terminal/terminal in each method of the embodiments of the present disclosure. For brevity, details will not be repeated herein again.

The embodiment of the present disclosure further provides a computer program product, including computer program instructions.

In an embodiment, the computer program product may be applied to the network device in the embodiment of the disclosure, and the computer program instructions are executed to cause the computer to perform the corresponding processes implemented by the network device in each method of the embodiments of the present disclosure. For brevity, details will not be repeated herein again.

In an embodiment, the computer program product may be applied to the mobile terminal/terminal in the embodiment of the disclosure, and the computer program instructions are executed to cause the computer to perform the corresponding processes implemented by the mobile terminal/terminal in each method of the embodiments of the present disclosure. For brevity, details will not be repeated herein again.

The embodiment of the present disclosure also provides a computer program.

In an embodiment, the computer program may be applied to the network device in the embodiments of the disclosure, and the computer program is run on a computer, to cause the computer to perform the corresponding processes implemented by the network device in each method of the embodiments of the present disclosure. For brevity, details will not be repeated herein again.

In an embodiment, the computer program may be applied to the mobile terminal/terminal in the embodiments of the disclosure, and the computer program is run on a computer, to cause the computer to perform the corresponding processes implemented by the mobile terminal/terminal in each method of the embodiments of the present disclosure. For brevity, details will not be repeated herein again.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that for the specific working process of the system, device and unit described above, reference may be made to the corresponding processes in the method embodiments, and the specific working process of the system, device and unit will not be elaborated herein for convenient and brief description.

In some embodiments provided by the disclosure, it should be understood that the disclosed system, device and method may be implemented in another manner. For example, the device embodiments described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, functional units in each embodiment of the disclosure may be integrated into a processing unit, each functional unit may also physically exist independently, and two or more than two functional units may also be integrated into a unit.

If the above functions are implemented in the form of a software function module and sold or used as an independent product, the functions may also be stored in a computer-readable storage medium. Based on such understanding, the essential part of the technical solutions of the embodiments of the present disclosure or a part of the technical solutions that contributes to related technologies or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the embodiments of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should be subject to the protection scope of the claims.

The invention claimed is:

1. A method of wireless communication of a terminal device, comprising:
   receiving, by the terminal device, configuration information of a Secondary Cell Group (SCG) from a network device, the configuration information of the SCG comprising first indication information; and
   in response to the first indication information indicating that the SCG is in a deactivated state, determining, by the terminal device, a behavior of the terminal device after the SCG is deactivated, and whether to perform a random access procedure to a Primary Secondary cell (PSCell);
   wherein the configuration information of the SCG further comprises first configuration information, and the first configuration information is used for determining the behavior of the terminal device after the SCG is deactivated; the first configuration information comprises a first bitmap, and each bit in the first bitmap corresponds to a respective behavior and has a value indicating whether the respective behavior need to be performed by the terminal device after the SCG is deactivated; and behaviors corresponding to all bits in the first bitmap comprise channel status indicator (CSI) measurement, CSI report, radio link failure (RLF) recovery, beam failure detection (BFD), beam failure recovery (BFR) and timing advance (TA) maintenance.

2. The method of claim 1, wherein:
   the first configuration information comprises second indication information, the second indication information indicating a type of SCG deactivation,
   when the second indication information indicates that the SCG deactivation is of a first type, the second indication information indicates that the terminal device does not need to perform at least one behavior for a Primary Secondary Cell (PSCell), and
   when the second indication information indicates that the SCG deactivation is of a second type, the second indication information indicates that the terminal device needs to perform the at least one behavior for the PSCell.

3. The method of claim 1, wherein the configuration information of the SCG is carried in a Radio Resource Control (RRC) reconfiguration message or an RRC resume message.

4. The method of claim 1, wherein in response to the first indication information indicating that the SCG is in a deactivated state, determining, by the terminal device, whether to perform a random access procedure to a Primary Secondary cell (PSCell) comprises:
   in response to receiving a first command from a Master Node (MN), determining, by the terminal device, to perform the random access procedure to the PSCell, and obtaining, by the terminal device, uplink synchronization with the PSCell; wherein the first command is used for triggering the terminal device to perform the random access procedure to the PSCell.

5. The method of claim 1, wherein the SCG configuration information further comprises second configuration information, the second configuration information comprising a first threshold; and in response to the first indication information indicating that the SCG is in a deactivated state, determining, by the terminal device, whether to perform a random access procedure to a Primary Secondary cell (PSCell) comprises:
   after the SCG is deactivated, in a case that a signal quality of the PSCell measured by the terminal device is less than or equal to the first threshold, determining, by the terminal device, to perform the random access procedure to the PSCell, and obtaining, by the terminal device, uplink synchronization with the PSCell; wherein the signal quality comprises at least one of a Reference Signal Received Power (RSRP) or a Reference Signal Received Quality (RSRQ).

6. The method of claim 1, wherein the SCG configuration information further comprises second configuration information, the second configuration information comprising a second threshold; and in response to the first indication information indicating that the SCG is in a deactivated state, determining, by the terminal device, whether to perform a random access procedure to a Primary Secondary cell (PSCell) comprises:
after the SCG is deactivated, in a case that a variation of a signal quality of the PSCell measured by the terminal device is greater than or equal to the second threshold, determining, by the terminal device, to perform the random access procedure to the PSCell, and obtaining, by the terminal device, uplink synchronization with the PSCell; wherein the signal quality comprises at least one of a Reference Signal Received Power (RSRP) or a Reference Signal Received Quality (RSRQ).

7. The method of claim 1, wherein the SCG configuration information further comprises second configuration information, and the second configuration information comprises length information of a first period; and in response to the first indication information indicating that the SCG is in a deactivated state, determining, by the terminal device, whether to perform a random access procedure to a Primary Secondary cell (PSCell) comprises:
after the SCG is deactivated, performing periodically, by the terminal device, based on the length information of the first period, the random access procedure to the PSCell, and obtaining, by the terminal device, uplink synchronization with the PSCell.

8. The method of claim 1, wherein the SCG configuration information further comprises second configuration information, and the second configuration information comprises length information of a first timer; and in response to the first indication information indicating that the SCG is in a deactivated state, determining, by the terminal device, whether to perform a random access procedure to a Primary Secondary cell (PSCell) comprises:
after the SCG is deactivated, starting, by the terminal device, the first timer at a first time instant; wherein the first time instant is a time instant when the SCG is deactivated, or a time instant when a Timing Advance Timer (TAT) is expired, or a time instant when the TAT is stopped; and
in response to expiration of the first timer, performing, by the terminal device, the random access procedure to the PSCell, and obtaining, by the terminal device, uplink synchronization with the PSCell.

9. A terminal device, comprising:
a processor; and
memory storing instructions, which when executed by the processor, cause the terminal device to:
receive configuration information of a Secondary Cell Group (SCG) from a network device, the configuration information of the SCG including first indication information; and
in response to that the first indication information indicates that the SCG is in a deactivated state, determine a behavior of the terminal device after the SCG is deactivated, and determine whether to perform a random access procedure to a Primary Secondary cell (PSCell);
wherein the configuration information of the SCG further comprises first configuration information, and the first configuration information is used for determining the behavior of the terminal device after the SCG is deactivated; the first configuration information comprises a first bitmap, and each bit in the first bitmap corresponds to a respective behavior and has a value indicating whether the respective behavior need to be performed by the terminal device after the SCG is deactivated; and behaviors corresponding to all bits in the first bitmap comprise channel status indicator (CSI) measurement, CSI report, radio link failure (RLF) recovery, beam failure detection (BFD), beam failure recovery (BFR) and timing advance (TA) maintenance.

10. The terminal device of claim 9, wherein:
the first configuration information comprises second indication information, the second indication information indicating a type of SCG deactivation,
when the second indication information indicates that the SCG deactivation is of a first type, the second indication information indicates that the terminal device does not need to perform at least one behavior for a Primary Secondary Cell (PSCell), and
when the second indication information indicates that the SCG deactivation is of a second type, the second indication information indicates that the terminal device needs to perform the at least one behavior for the PSCell.

11. The terminal device of claim 9, wherein the configuration information of the SCG is carried in a Radio Resource Control (RRC) reconfiguration message or an RRC resume message.

12. The terminal device of claim 9, wherein determination of whether to perform a random access procedure to a Primary Secondary cell (PSCell) in response to the first indication information indicating that the SCG is in a deactivated state comprises:
in response to receiving a first command from a Master Node (MN), determining to perform the random access procedure to the PSCell, and obtaining uplink synchronization with the PSCell; wherein the first command is used for triggering the terminal device to perform the random access procedure to the PSCell.

13. The terminal device of claim 9, wherein the SCG configuration information further comprises second configuration information, the second configuration information comprising a first threshold; and determination of whether to perform a random access procedure to a Primary Secondary cell (PSCell) in response to the first indication information indicating that the SCG is in a deactivated state comprises:
after the SCG is deactivated, in a case that a signal quality of the PSCell measured by the terminal device is less than or equal to the first threshold, determining to perform the random access procedure to the PSCell, and obtaining uplink synchronization with the PSCell; wherein the signal quality comprises at least one of a Reference Signal Received Power (RSRP) or a Reference Signal Received Quality (RSRQ).

14. The terminal device of claim 9, wherein the SCG configuration information further comprises second configuration information, the second configuration information comprising a second threshold; and determination of whether to perform a random access procedure to a Primary Secondary cell (PSCell) in response to the first indication information indicating that the SCG is in a deactivated state comprises:

after the SCG is deactivated, in a case that a variation of a signal quality of the PSCell measured by the terminal device is greater than or equal to the second threshold, determining to perform the random access procedure to the PSCell, and obtaining uplink synchronization with the PSCell; wherein the signal quality comprises at least one of a Reference Signal Received Power (RSRP) or a Reference Signal Received Quality (RSRQ).

15. The terminal device of claim 9, wherein the SCG configuration information further comprises second configuration information, and the second configuration information comprises length information of a first period; and determination of whether to perform a random access procedure to a Primary Secondary cell (PSCell) in response to the first indication information indicating that the SCG is in a deactivated state comprises:

after the SCG is deactivated, performing periodically, based on the length information of the first period, the random access procedure to the PSCell, and obtaining uplink synchronization with the PSCell.

16. The terminal device of claim 9, wherein the SCG configuration information further comprises second configuration information, and the second configuration information comprises length information of a first timer; and determination of whether to perform a random access procedure to a Primary Secondary cell (PSCell) in response to the first indication information indicating that the SCG is in a deactivated state comprises:

after the SCG is deactivated, starting the first timer at a first time instant; wherein the first time instant is a time instant when the SCG is deactivated, or a time instant when a Timing Advance Timer (TAT) is expired, or a time instant when the TAT is stopped; and in response to expiration of the first timer, performing the random access procedure to the PSCell, and obtaining uplink synchronization with the PSCell.

17. A network device, comprising:
a processor; and
memory storing instructions, which when executed by the processor, cause the network device to:
send configuration information of a Secondary Cell Group (SCG) to a terminal device, the configuration information of the SCG comprising first indication information,
wherein the configuration information of the SCG is used for the terminal device to determine a behavior of the terminal device, in response to the first indication information indicating that the SCG is in a deactivated state, and to determine whether to perform a random access procedure to a Primary Secondary cell (PSCell);

wherein the configuration information of the SCG further comprises first configuration information, and the first configuration information is used for determining the behavior of the terminal device after the SCG is deactivated; the first configuration information comprises a first bitmap, and each bit in the first bitmap corresponds to a respective behavior and has a value indicating whether the respective behavior need to be performed by the terminal device after the SCG is deactivated; and behaviors corresponding to all bits in the first bitmap comprise channel status indicator (CSI) measurement, CSI report, radio link failure (RLF) recovery, beam failure detection (BFD), beam failure recovery (BFR) and timing advance (TA) maintenance.

18. The network device of claim 17, wherein the configuration information of the SCG is carried in a Radio Resource Control (RRC) reconfiguration message or an RRC resume message.

19. The network device of claim 17, wherein the configuration information of the SCG is used for the terminal device to:

in response to receiving a first command from a Master Node (MN), determine to perform the random access procedure to the PSCell, and obtain uplink synchronization with the PSCell; wherein the first command is used for triggering the terminal device to perform the random access procedure to the PSCell.

20. The network device of claim 17, wherein the SCG configuration information further comprises second configuration information, the second configuration information comprising a first threshold; and the second configuration information is used for the terminal device to:

after the SCG is deactivated, in a case that a signal quality of the PSCell measured by the terminal device is less than or equal to the first threshold, determine to perform the random access procedure to the PSCell, and obtain uplink synchronization with the PSCell; wherein the signal quality comprises at least one of a Reference Signal Received Power (RSRP) or a Reference Signal Received Quality (RSRQ).

* * * * *